United States Patent
Silverstein et al.

(10) Patent No.: US 6,882,755 B2
(45) Date of Patent: Apr. 19, 2005

(54) IMAGE TRANSMISSION FOR LOW BANDWIDTH WITH REGION OF INTEREST

(75) Inventors: D. Amnon Silverstein, Mtn. View, CA (US); Mei Chen, Stanford, CA (US); Debargha Mukherjee, Palo Alto, CA (US); Amir Said, Cupertino, CA (US); Nirmalya Ray, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 725 days.

(21) Appl. No.: 10/039,994

(22) Filed: Oct. 19, 2001

(65) Prior Publication Data

US 2003/0077002 A1 Apr. 24, 2003

(51) Int. Cl.[7] .................................................. G06K 9/36
(52) U.S. Cl. ....................... 382/282; 382/284; 382/232; 382/313
(58) Field of Search ................................. 382/282, 284, 382/232, 313

(56) References Cited

U.S. PATENT DOCUMENTS

| | | | | |
|---|---|---|---|---|
| 4,682,869 A | | 7/1987 | Itoh et al. | |
| 5,453,788 A | * | 9/1995 | Matsushima et al. | 348/395.1 |
| 5,543,844 A | * | 8/1996 | Mita et al. | 375/240.2 |
| 5,845,015 A | * | 12/1998 | Martucci | 382/250 |
| 6,625,309 B1 | * | 9/2003 | Li et al. | 382/173 |

FOREIGN PATENT DOCUMENTS

| | | |
|---|---|---|
| WO | WO 99/19839 | 4/1999 |
| WO | WO99/49412 | 9/1999 |
| WO | WO00/01153 | 1/2000 |
| WO | WO00/04721 | 1/2000 |

\* cited by examiner

*Primary Examiner*—Leo Boudreau
*Assistant Examiner*—Tom Y. Lu

(57) ABSTRACT

A system and method of transmitting an image adapted to a first display area size, such as a standard computer screen having a particular pixel-by-pixel resolution, to an apparatus having a smaller second display area size by scaling the image through coefficient cropping its frequency domain representation. When the cropped frequency coefficients are used to display an image within the second smaller display area, a scaled version of the image is displayed. In a specific embodiment, frequency domain coefficients are cropped such that a region of interest of the image is scaled down less than the remainder of the image when displayed in the second smaller display area. Scaling in this manner provides the user with a readable region of interest with the remainder of the image scaled down so as to facilitate easy image navigation by the user.

17 Claims, 10 Drawing Sheets

Coefficients in Frequency domain        Image in spatial domain

| A (8:1) | B (4:1) | C (8:1) |
|---|---|---|
| D (4:1) | E (2:1) | F (4:1) |
| G (8:1) | H (4:1) | I (8:1) |

IMAGE TRANSMISSION FOR LOW BANDWIDTH WITH REGION OF INTEREST

FIELD OF THE INVENTION

The present invention relates to transmitting image data for display on two different display screen areas, and more particularly, this disclosure provides a system and method for transmitting image data for display between two differently sized display areas such that a region of interest is viewable to a user.

BACKGROUND OF THE INVENTION

Handheld or portable devices, such as personal digital assistants (PDAs), provide a user the flexibility of remotely accessing information sources such as servers, databases and the internet. They are also used to operate software that was originally designed for desktop machines. For example, many Microsoft desktop applications will run on handheld machines. One of the main drawbacks that is encountered when using a handheld device to access these types of information sources is that the image data is not adapted to the smaller display area of the handheld device. In other words, the image does not "fit" within the handheld device's smaller display area.

According to one technique developed to overcome the problems caused by the disparity between the handheld device display area size to the actual image size, only a portion of the image is displayed within the smaller display area. The user can then navigate through the entire image using the hand held devices input interface (e.g., wand, keys, buttons, mouse, etc.) to view the other portions of the image. For instance, if a user remotely accesses a web page with a PDA, only a small portion of the web page is displayed within the PDA display area and the user navigates to other portions of the web page via the user interface. This partial viewing of the image can be confusing and frustrating to the user since it can become unclear where in the image the user is viewing, thereby making navigation through the image difficult. Hence, partial viewing represents one of the major impediments to interacting with information intended for large display devices. One alternative to partial viewing is that the full sized image is "scaled down" into the smaller display area of the small display area device. However, this technique often makes it difficult or impossible to view image details depending on the size of the display area.

In another known technique, instead of equally "scaling down" the whole image, the entire image is displayed in a PDA-type display area by scaling down a selected portion (or region of interest) at a relatively low scaling factor while using a relatively higher scaling factor or factors for the remainder of the image. In this way, the region of interest is readable by the user and the remainder of the image is discernable enough to provide context for navigation. When the user navigates to other portions of the full image with a user interface and selects new regions of interest, the scaling factor of the new region of interest is reduced (i.e., reduced such that the region becomes readable) while the remainder of the image regions including the old region of interest is scaled down using a higher scaling factor. This technique facilitates navigation about a larger image that is displayed on a relatively smaller display area.

In order to display a scaled version of an image as described above, one known method (shown in FIG. 1A) is to convert the image region into a frequency domain representation including a plurality of frequency coefficients and then transmit all the frequency coefficients from the image source to the destination device (e.g. a PDA). Next, the transformation is inverted to obtain a full sized spatial domain image region, and then this image region is scaled down to the desired size in the spatial domain. This method is illustrated in FIG. 1A, such that an image region is converted into a frequency domain representation and a frequency coefficient array 10 is transmitted to the destination device. The inverse transformation converts the array back to spatial image data 11 of the same size as the original image region. Then image region 11 is scaled to the desired size 12. The problem with this method is that it requires the transmission of all frequency coefficients and hence, requires a large amount of bandwidth.

The disadvantage of the method shown in FIG. 1A is that whenever remotely accessing image sources with a handheld device the image data is often wirelessly transmitted over a communication path having a finite bandwidth. A small or overburdened communication path can significantly hinder the users ability to quickly access remote information by limiting the amount of data that can be transmitted between the information source and the handheld device. Hence, there is a strong motivation to reduce bandwidth usage while providing as much information as possible. However, transmitting all frequency coefficients tends to consume a relatively large amount of bandwidth that can potentially result in slow remote access times or an inability to remotely access certain image data. Hence, what is needed is a manner in which to transmit digital images between an image source and a handheld device in a bandwidth efficient manner.

The present invention, in general, is directed towards displaying large images and user interfaces originating from an information source (e.g., a server) within a small display area, such as the display area of a handheld device (e.g., PDA). In addition, this disclosure is directed to providing a system and method of transmitting an image in a bandwidth conservative manner from an information source to a handheld device.

SUMMARY OF THE INVENTION

A system and method of transmission is described for transmitting image data adapted to a first display area size to an apparatus having a smaller second display area size. The system and method of transmission allows a user to view a large image on a hand held device with a small display area by magnifying a region of interest within the large image and de-magnifying peripheral areas about the region of interest, causing, for example, a "fisheye" view of the image to be displayed in the handheld device display area.

In accordance with the system and method, the image data, which is adapted for display in a first display area size, is divided into a plurality of regions each having a corresponding block of image data. Each block of image data is then converted into a frequency domain representation of the block having an associated array of coefficients. Frequency coefficients are cropped from at least a portion of the arrays so as to spatially scale corresponding image regions within the spatial domain dependent on the amount of cropping. Then cropped and uncropped arrays are transmitted to the apparatus for displaying a scaled version of the image in the second display area. In one embodiment, coefficient arrays of the image regions corresponding to a region of interest are uncropped and coefficient arrays of image regions peripheral to the region of interest are cropped. The coefficients corresponding to the region of interest, together with the cropped portions of coefficients for the peripheral regions, are transmitted to the apparatus. These transmitted coefficients are reverted to the spatial domain to render the "fisheye" view in the second display area.

BRIEF DESCRIPTION OF THE DRAWINGS

The objects, features, and advantages of the present invention will be apparent to one skilled in the art, in view of the following detailed description in which.

DETAILED DESCRIPTION

In general, the system and method of the present invention is a technique of transmitting an image adapted to a first display area size, such as a standard computer screen having a particular pixel-by-pixel resolution, to an apparatus having a smaller display area size by scaling the image in the spatial domain by means of coefficient cropping in the frequency domain. When the cropped coefficients are used to display an image within the second smaller display area, a scaled version of the image is displayed. In a specific embodiment, frequency domain coefficients are cropped such that a region of interest of the image is scaled down less than the remainder of the image when displayed in the second smaller display area. Scaling in this manner provides the user with a readable region of interest and with the remainder of the image scaled down so as to facilitate easy image navigation by the user. Furthermore the system and method is a technique of transmitting image data to the apparatus in a bandwidth efficient manner such that only a required subset of the coefficient data is transmitted and combined with previously transmitted coefficient data when the region of interest is changed.

Figure 1A:
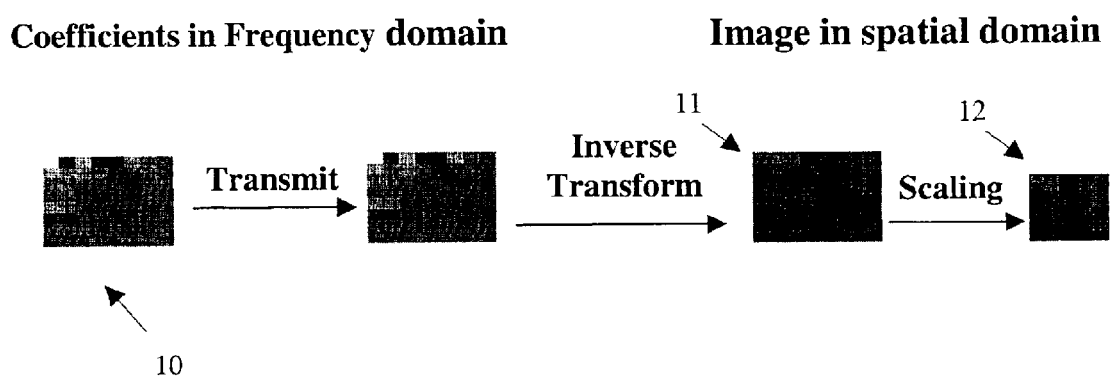
FIG. 1A a prior art method of scaling image data transmitted from an image source having a first associated display area size to a destination device having a second smaller display area size.
Figure 1B:
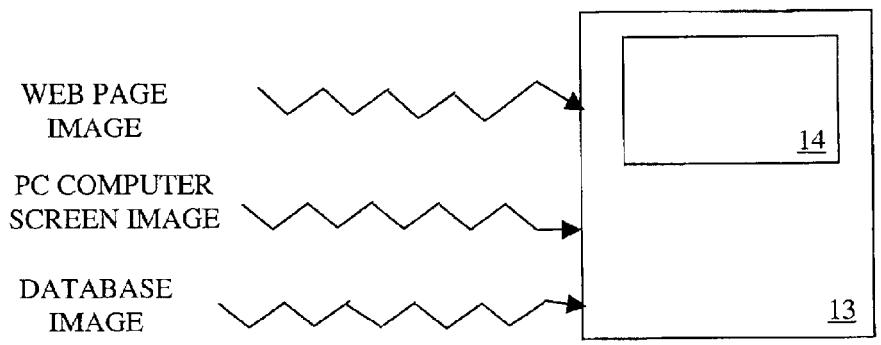
FIG. 1B shows examples of different remote images being wirelessly transmitted to a handheld device.

FIG. 1B shows examples of different images adapted to a first display area size that might be transmitted to an apparatus 13 having a display area 14 of a second smaller display area size. As shown in the examples, the image can include a webpage image, the image of the desktop of a users personal computer (PC) that is being remotely accessed, or the image of a portion of a database. Any of these images can be transmitted over an intranet, internet, or direct connection. In addition, the images may be wirelessly transmitted or transmitted over a wire connection (not shown). The images may be accessed through a server or may be directly accessed. The apparatus 13 may be any device having at least a display area, a means of receiving an image signal, and a means for driving the display area to display an image corresponding to the image signal within the display area. Some commonly known examples of these types of apparatus include a PDA, a telephone, a cellular phone, and a laptop.

Figure 2:
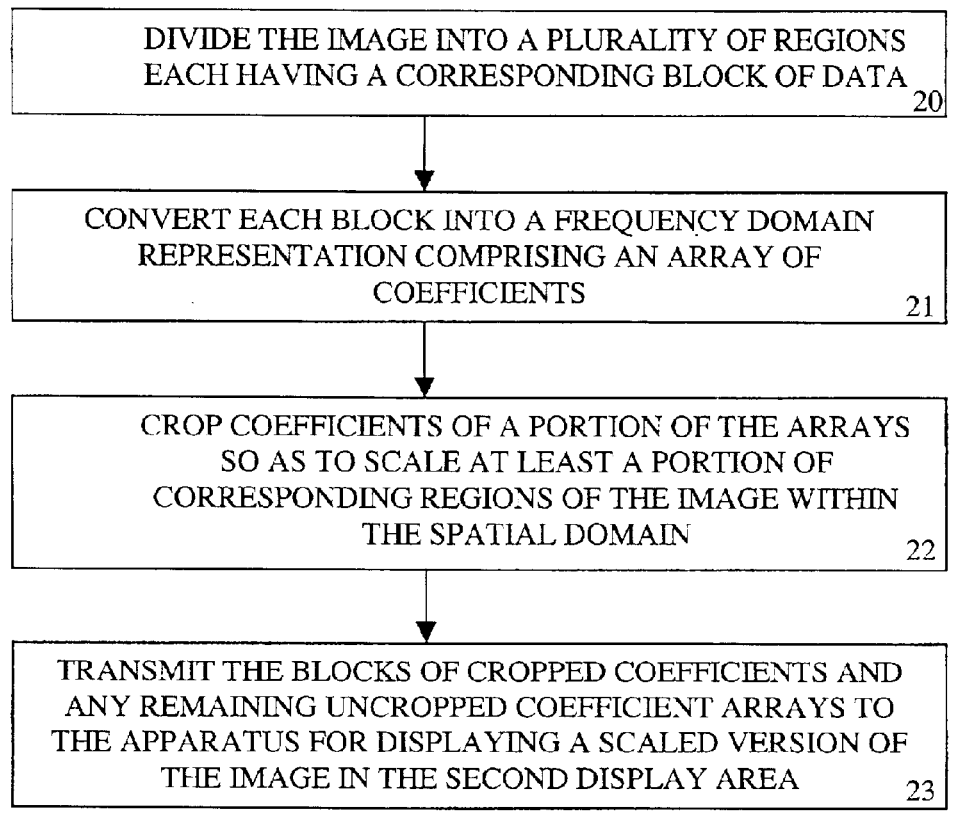
FIG. 2 illustrates a method of transmitting image data adapted to a first display area to an apparatus having a second display area according to the present invention.
Figure 3:
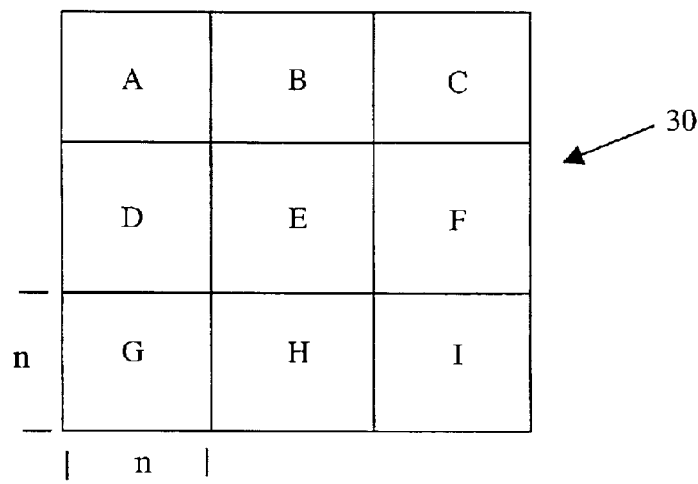
FIG. 3 shows an example of an image being divided into a plurality of regions.

FIG. 2 shows a first embodiment of a method of transmitting an image adapted to a first display area size to an apparatus having a second display area size which includes dividing the image into a plurality of regions each having a corresponding block of data (block 20). For instance, FIG. 3 shows an example of an image 30 being divided into a plurality of regions, A–I, each region having a corresponding block of data of n×n pixels.

Each of the blocks of data is converted into a frequency domain representation of the data to generate a corresponding array of frequency coefficients (block 21, FIG. 2). Hence, each block of data corresponding to each of regions A–I in the example shown in FIG. 3 is converted into a corresponding array of frequency coefficients.

According to the present invention, the task of spatial scaling is achieved by frequency coefficient cropping. Hence, unlike the prior art method shown in FIG. 1A in which the scaling of each region is performed within the spatial domain after transmitting to a destination device, the method shown in FIG. 2 crops the frequency array of the region to be scaled such that once it is reconverted into the spatial domain it is already scaled to the desired factor. The effect of frequency cropping a given image in its frequency domain representation followed by a transformation to the spatial domain is mathematically equivalent to and yields essentially the same results as the prior art technique of spatially scaling the same given image. Hence, according to the method shown in FIG. 2, frequency coefficients of a portion of the arrays are cropped so as to scale at least a portion of corresponding regions of the image within the spatial domain (block 22) and then blocks of cropped coefficients and any remaining uncropped coefficient arrays are transmitted to the apparatus for displaying a scaled version of the image in the second display area (block 23).

Figure 4:
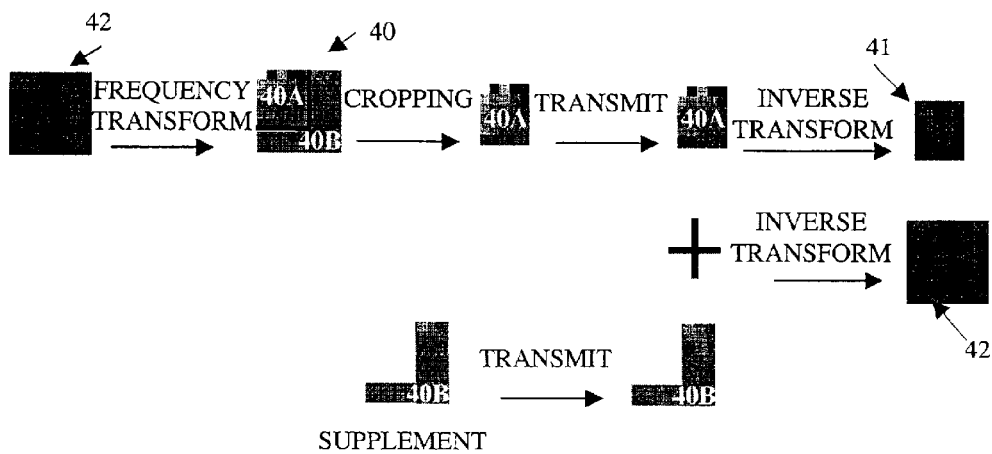
FIG. 4 illustrates the concept of cropping frequency coefficients corresponding to an image region to obtain a spatially scaled image region.

FIG. 4 illustrates the concept of cropping frequency coefficients to obtain a spatially scaled image region. In the more bandwidth efficient manner according to the present invention, a frequency coefficient array 40 corresponding to an image region is first cropped to the desired scale 40A determined by the display size on the client device. Only the necessary coefficients 40A are transmitted to the client device and reconverted to produce an image region 41 scaled proportionally to the amount of coefficients that have been cropped. Note that image region 41 looks the same as the prior art scaled image region 12 (FIG. 1A). When an image of a larger scale is desired, only supplementary frequency coefficients 40B need to be transmitted. The supplementary coefficients 40B can be combined with previously transmitted coefficients 40A to generate an image region of the original size 42. Note that we can further enlarge the image by padding zeros to the transmitted frequency coefficients to larger scales.

Figure 5:
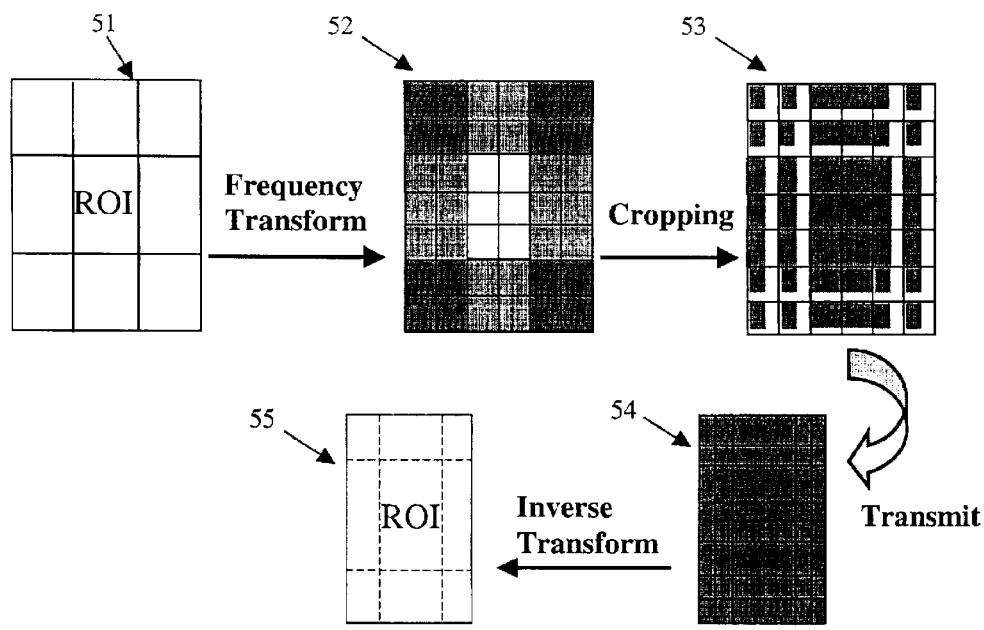
FIG. 5 illustrates coefficient cropping in the frequency domain representation of a full image and its effect on the full image in the spatial domain.

The method shown in FIG. 4 as applied to a full image is shown in FIG. 5. First, the full image is divided into regions 51. Secondly, each region is converted to an array of frequency coefficients 52. These frequency coefficients are then cropped to the desired scales 53. Only necessary coefficients 54 are transmitted to the client apparatus. An inverse transformation yields the second display of desired scales 55. Note that, in the embodiment shown in FIG. 5, the frequency coefficients associated with the region of interest (ROI) are not cropped, thus after transmission and inverse transformation it is restored to the original size. As mentioned above, the ROI can be further enlarged by padding zeros to the transmitted frequency coefficients associated with the ROI.

Hence, only necessary coefficients are transmitted to the apparatus, where an inverse transformation generates the second display with regions scaled proportionally to the extent of cropped frequency coefficients. More importantly, if afterwards a larger image is desired, only supplementary frequency coefficients need to be transmitted. These supplementary coefficients can be combined with previously transmitted coefficients to render a less scaled image. This scheme is bandwidth efficient as only necessary data is transmitted, and all transmitted data can be reused.

Figure 6A:
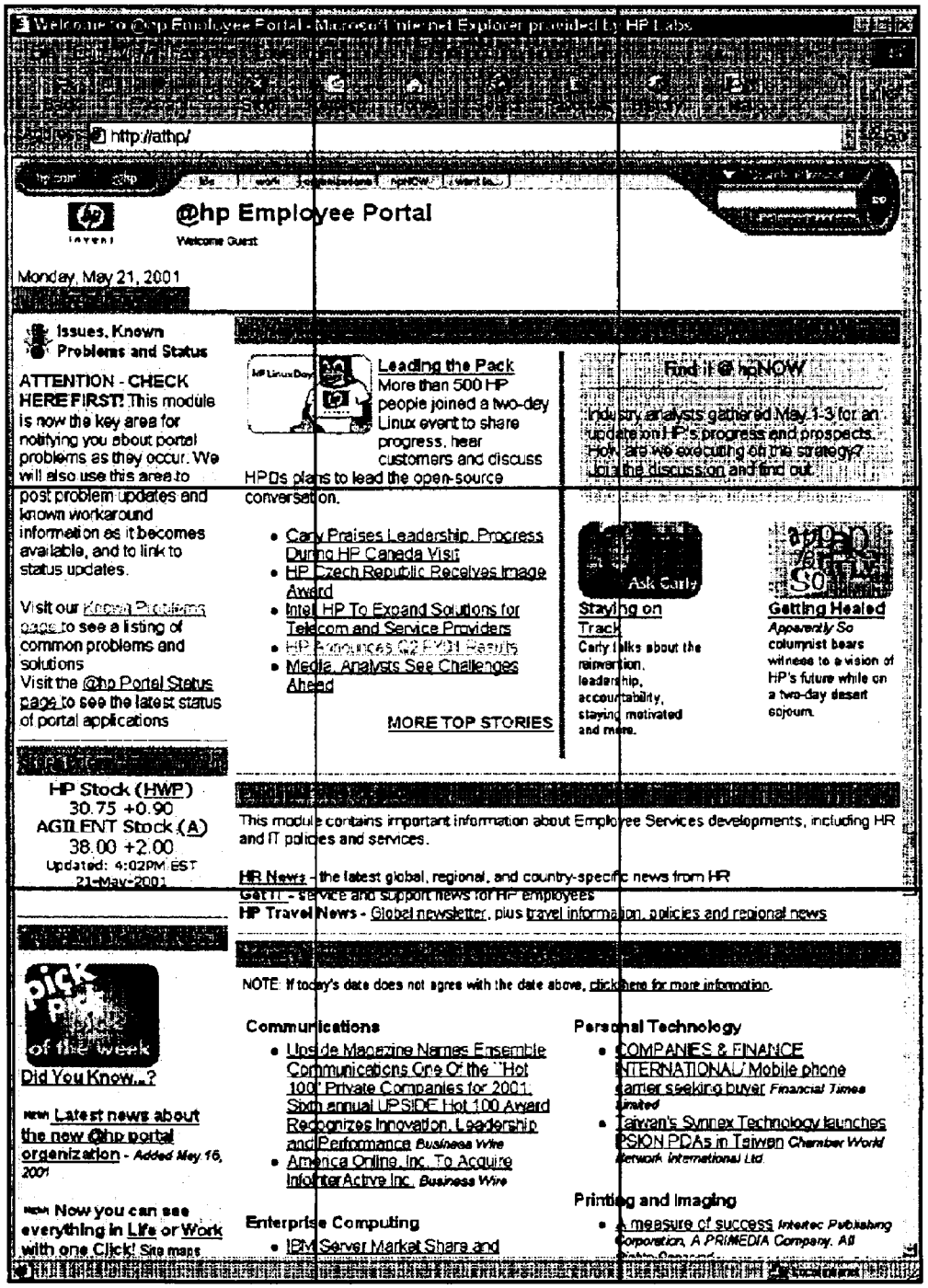
FIGS. 6A and 6B show an example of scaling a full size image by scaling at least a portion of the blocks of the image data using coefficient cropping.
Figures 6B, 6C:
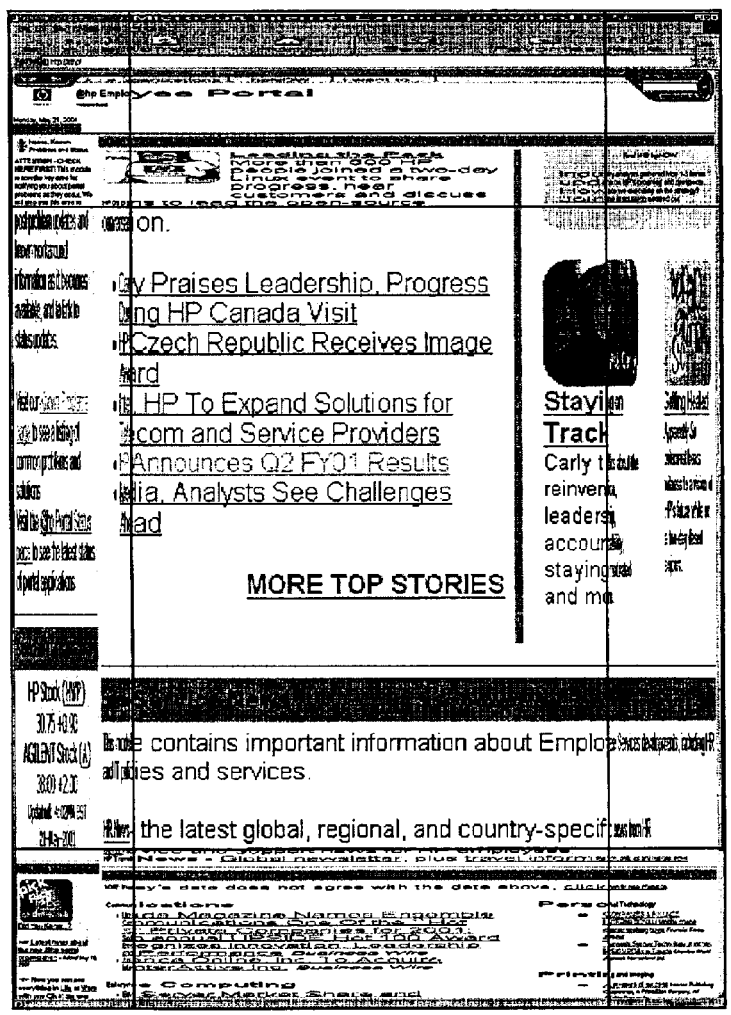
FIG. 6C shows a scale map for the image shown in FIG. 6A.

FIGS. 6A–6C show an example of a full size image scaled to be displayed on a second smaller display area. FIG. 6A shows a full size image partitioned into regions each having associated blocks of image data. FIG. 6B shows a scaled version of the image. As can be seen some regions of the scaled image have higher scaling than others. For instance, the comer regions are scaled greater than the side regions and the side regions are scaled greater than the center region. In this example, the center region (i.e., the region of interest) has been scaled, so as to make it readable to the user, however, the center region need not be scaled at all and may be displayed at full size. FIG. 6C shows a possible scale factor mapping of the image where the data blocks corresponding to the corners have been scaled by a factor of 8:1, the data blocks corresponding to the sides have been scaled by a factor of 4:1, and the data block corresponding to the center has been scaled by 2:1.

Figure 7A:
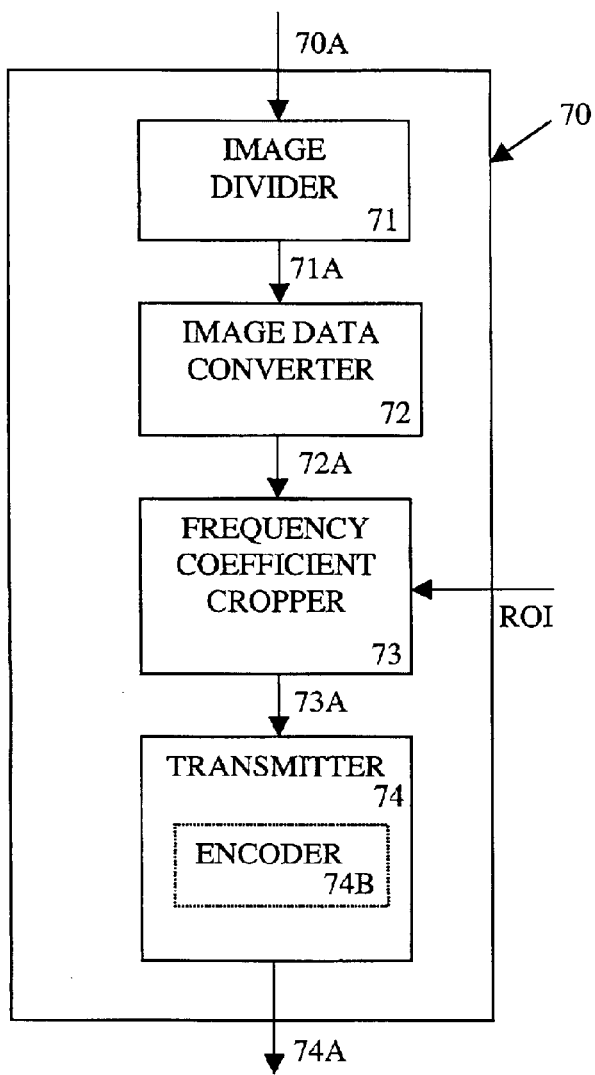
FIG. 7A illustrates an embodiment of a system for transmitting image data adapted to a first display area to an apparatus having a second smaller display area according to the present invention.

FIG. 7A illustrates one embodiment of a system 70 for transmitting image data adapted to a first display area size to a second smaller display area size including an image divider 71 for receiving image data 70A that is adapted to a first display area size and for dividing the image into a plurality of regions each corresponding to a block of image data 71A. The system further includes an image data converter 72 for converting each of the plurality of blocks of data 71A into a corresponding frequency domain representation 72A—each representation including an array of coefficients. A frequency coefficient cropper 73 functions to crop arrays of coefficients depending on the desired scale to generate blocks of cropped coefficients 73A. A transmitter 74 transmits the cropped blocks of coefficients 73A as well as any uncropped arrays 72A. In one embodiment, the transmitter includes an encoder 74B for compressing the coefficient data 73A and 72A prior to transmission. In another embodiment, frequency coefficient cropping is performed dependent on a selected region of interest (i.e., ROI) pointer signal.

Figure 7B:
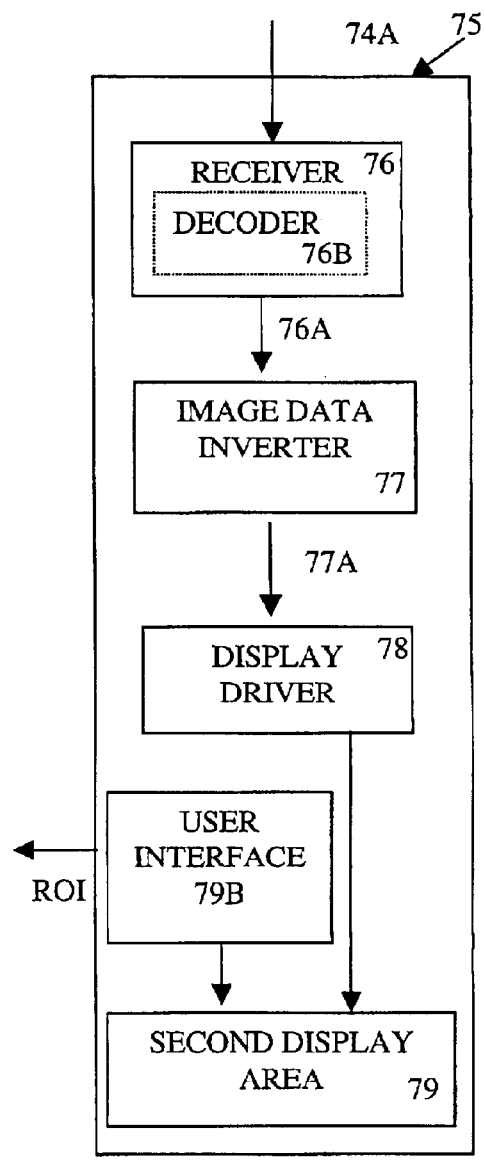
FIG. 7B illustrates an embodiment of an apparatus for receiving and displaying image data transmitted from the system shown in FIG. 7A.

FIG. 7B illustrates an apparatus 75 for displaying a scaled version of the image data 70A including a receiver 76 for receiving the cropped frequency coefficients 74A. In one embodiment, the receiver 76 includes a decoder 76B for decoding the compressed frequency data 74A. The receiver 76 provides decoded image data 76A to an image data inverter 77 to transform the frequency coefficients back to image data 77A. The image data 77A is passed to a display driver 78 which processes the image data to be displayed in the second display area 79. In one embodiment, the apparatus includes a user interface 79B for identifying a region of interest within the second display area and a means of transmitting a ROI signal to system 70.

In another embodiment of the system and method of the present invention, a new region of interest can be identified within a currently displayed scaled version of the image and supplemental frequency coefficient data can then be transmitted to the apparatus and combined with previously transmitted frequency coefficient data so as to display the scaled version of the image dependent on the new region of interest without having to re-transmit the coefficient data for the full image. The supplemental frequency coefficient data represents the difference between previously transmitted coefficient data including cropped and un-cropped blocks of coefficients, and newly determined coefficient data including new cropped and un-cropped blocks of coefficients determined in view of the new region of interest.

Figure 8:
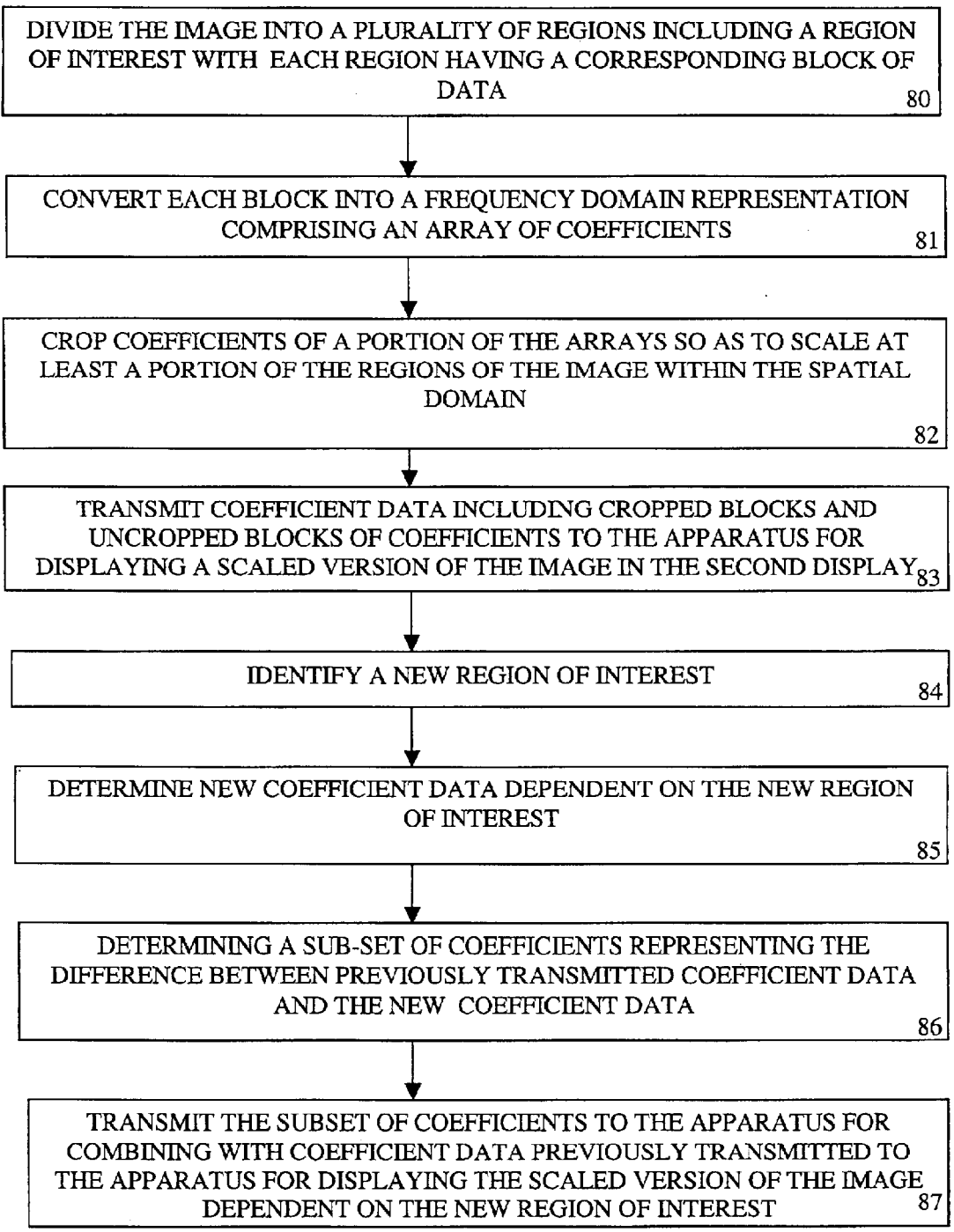
FIG. 8 illustrates a second embodiment of the method for transmitting image data adapted to a first display area to an apparatus having a second smaller display area having a changing region of interest.

FIG. 8 shows one embodiment of the method of transmission in which a new region of interest is identified. According to this embodiment, an image is divided into regions including a region of interest. Each region having a corresponding block of data (block 80), each block of data is converted into a frequency domain representation (block 81), and at least a portion of the frequency domain representations of the blocks are cropped dependent on the region of interest (block 82) so as to scale the image in the spatial domain. The coefficient data including the cropped blocks and uncropped blocks is then transmitted to the apparatus for displaying a scaled version of the image within the second display area (blocks 83). According to this method, frequency coefficients are cropped dependent on the region of interest such when the scaled version of the image is displayed in the second display area the region of interest is "readable" by the user and the non-regions of interest are discernable by the user so as to enable navigation through the image.

Once the coefficients are transmitted, a new region of interest can be identified (block 84). Identification of the region of interest can be performed by the user selecting the region within the second display area with a user interface adapted for interfacing with the apparatus. For example the user may use a "wand" to point to the second display area screen that is responsive to tactile user input. Alternatively, the user may select a new region of interest using buttons on the apparatus for navigating within the scaled image displayed within the second display area.

New coefficient data is determined including new cropped blocks of coefficients and new un-cropped blocks of coefficients dependent on the identified new region of interest (block 85). These cropped blocks and uncropped blocks of coefficients are determined in the same manner as the previously determined cropped and uncropped coefficients. Specifically, the frequency domain representation of the plurality of blocks of data corresponding to regions of the image are cropped dependent on the new region of interest such that the region of interest of the image is scaled so as to be readable by the user and the non-regions of interest are scaled so as to be discernable enough to enable navigation through the image.

In order to reduce bandwidth needed to transmit the scaled image to the apparatus according to this embodiment of the method of transmitting, a subset of coefficients are determined (block 86) that represents the difference between previously transmitted coefficient data (block 83) and the new coefficient data.

The subset of coefficients is transmitted (block 87) to the apparatus to be combined with the coefficient data that had been previously transmitted to the apparatus in order to display the scaled version dependent on the new region of interest. In other words, the subset of coefficient data transmitted to the apparatus corresponding to the new region of interest is used to essentially update and compliment the buffer storing all previously transmitted coefficient data. As new regions of interest are selected/changed, additional supplemental coefficients are transmitted.

Figure 9:
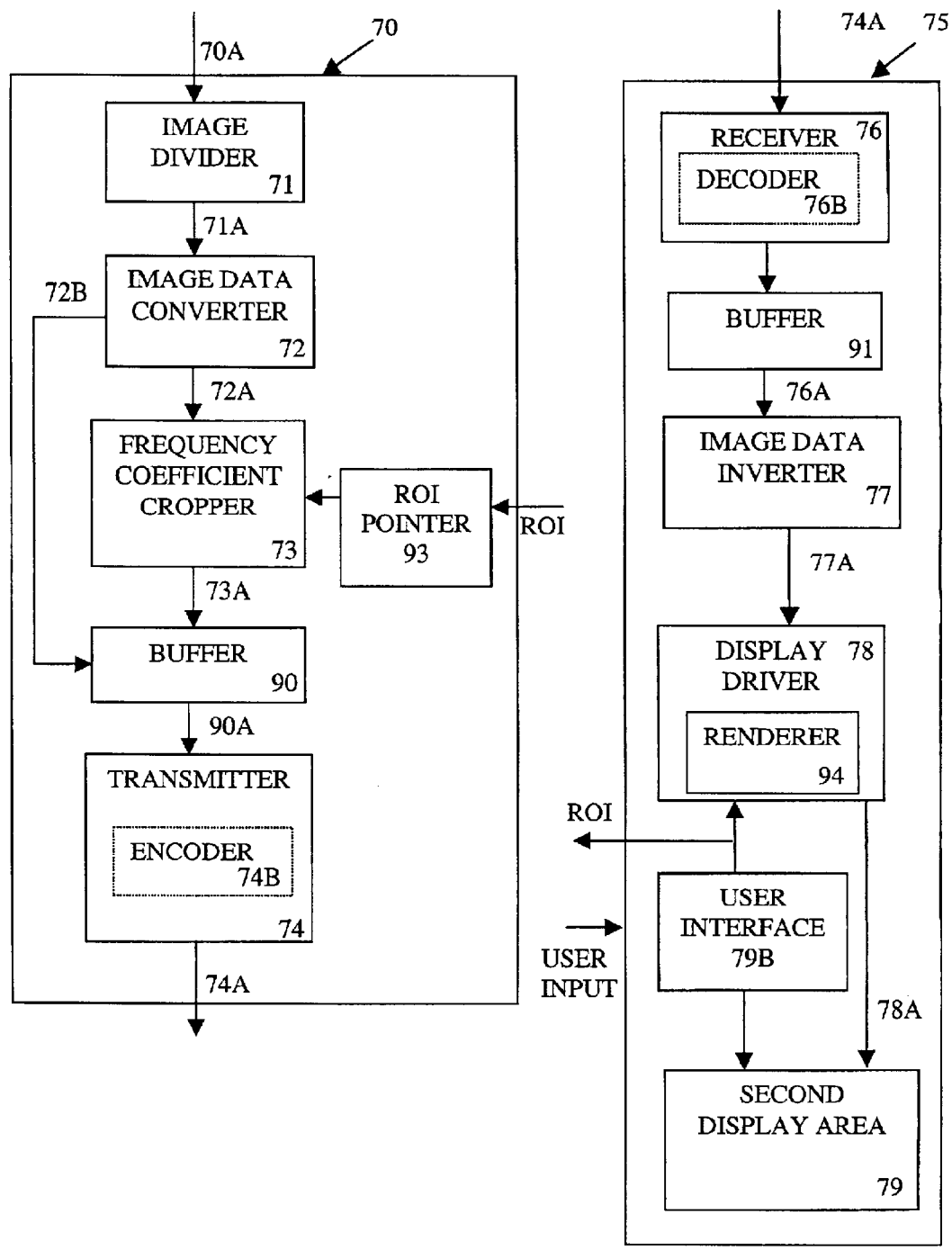
FIG. 9 illustrates a second embodiment of a system for transmitting image data adapted to a first display area to an apparatus having a second smaller display area.

In accordance with the method shown in FIG. 8, the system 70 as shown in FIG. 9 further includes a first buffer 90 for storing the previously transmitted coefficient data and a second buffer 91 within the apparatus 75 for storing all previously transmitted coefficient data received by the apparatus. The size of buffer 91 is such that it is able to store all coefficient data for an image formatted for displaying within the first display area (i.e., a full resolution image). The second buffer accumulates the coefficients until it potentially has a complete uncropped set of blocks of coefficients corresponding to the image. The first and second buffers are synchronized such that there is data consistency between the buffers (i.e., the first buffer as stored by the system is a copy of the second buffer as stored by the receiver). In one embodiment, the apparatus 75 includes a buffer synchronization mechanism (not shown) that interacts with the server to ensure that the buffers are synchronized.

In another embodiment, a bitstream of the encoded image signal 74A is transmitted by system 70 such that coefficient data 90A encoded within signal 74A is received by the apparatus 75 in an order of most perceptually significant to least perceptually significant. The perceptually significant sequence of transmitting the encoded coefficient data begins with transmitting the low order (i.e., low frequency) frequency coefficients so that a baseline image can be displayed and can be further refined. Next, higher order (i.e., high frequency) coefficients of the ROI are transmitted to further improve the ROI display quality. Then, the periphery regions about the ROI are further refined by transmitting the remainder of the coefficient data. When all visible information has been sent for the current view, the supplemental coefficients of the periphery can be sent if additional bandwidth is available. This is a form of predictive caching. If the user changes the ROI, the high order coefficients will become useful. If the user changes the ROI in a predictable fashion, by following down a column of text for example, the next ROI can be extrapolated and additional coefficients can be sent to refine the future ROI. This procedure is useful for applications requiring prompt feedback and responsiveness. It should be noted that the bitstream may be terminated at any time, for example, when the region of interest changes thereby initiating the generation of a new bitstream dependent on the new region of interest.

The system 70 further includes a ROI pointer register 93 for storing the region on interest point sent from the receiver as identified by the apparatus' user interface which is used to determine how each region of the image is scaled and hence the cropping of each corresponding coefficient array.

In one embodiment, the receiver 75 further includes an image renderer 94. In response to the ROI pointer provided by the user interface 79B, a rendering algorithm identifies the coefficients in the second buffer 91 to be used for displaying the scaled version of the image within the second display area.

In yet another embodiment, the perceptually significant sequence of transmitting the encoded coefficient data 74A is compiled in a prioritized and progressive manner. Once the user selects a region of interest, for each frequency coefficient block, the number of coefficients necessary for rendering the scaled second display 90 is determined, and the number of coefficients that are already transmitted is indicated in an image mask stored within system 70. Two statistics are constantly evaluated to prioritize the coefficients, one is the percentage of necessary coefficients that are already transmitted, the other is the number of necessary coefficients that are yet to be sent. The highest priority goes to the frequency coefficient block with the lowest percentage of necessary coefficients that are already transmitted. If all frequency coefficient blocks have the same percentile, then the highest priority goes to the frequency coefficient block with the most number of necessary coefficients that are yet to be transmitted. If all frequency coefficient blocks are still equal, then the coefficients are chosen following raster order, from left to right, from top to bottom. Within each frequency coefficient block, the coefficients are ordered in a zigzag manner similar to that is commonly used in JPEG convention.

Figure 10A:
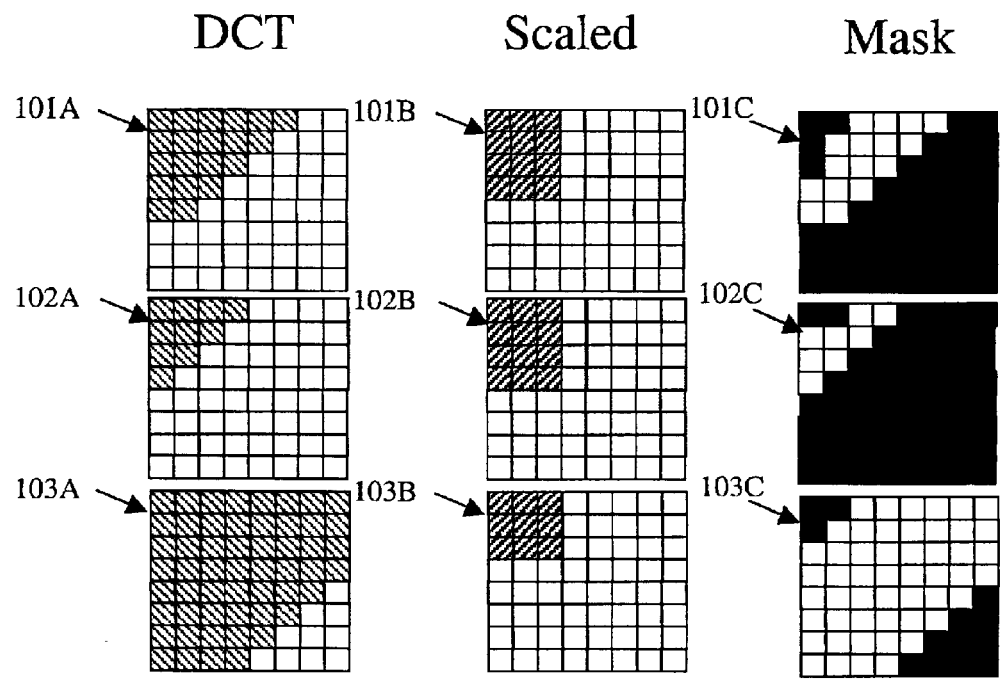
FIGS. 10A and 10B illustrate an embodiment of the method for transmitting image data in a prioritized and progressive manner, based on perceptual significance.
Figure 10B:
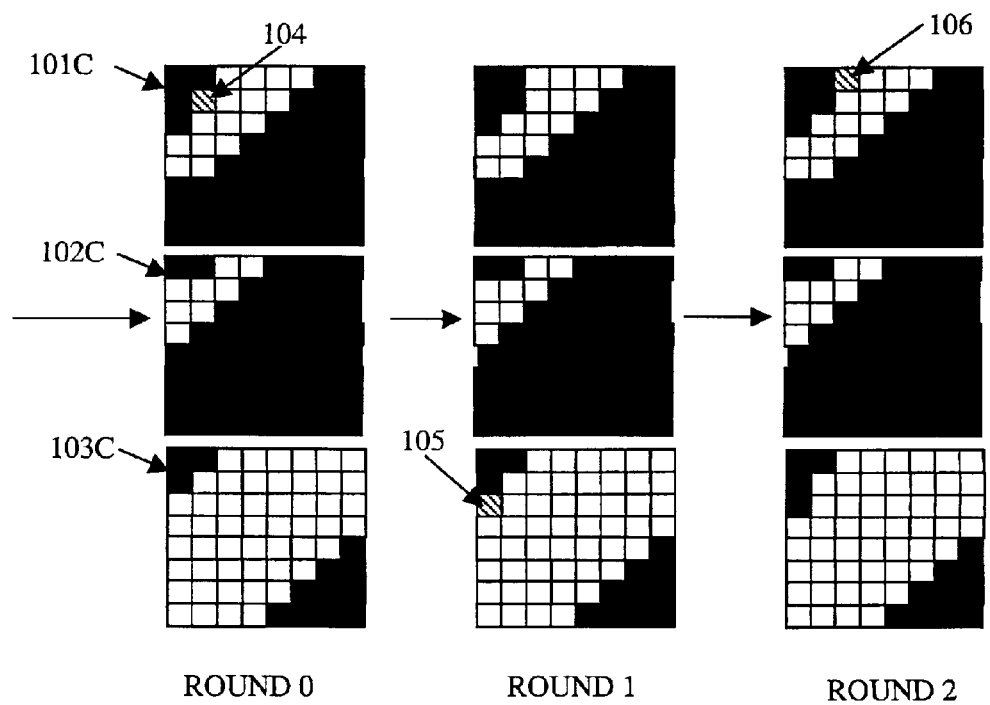

FIGS. 10A and 10B illustrate the above prioritized coefficient transport scheme. Frequency coefficient blocks 101A–103A (FIG. 10A) represent three blocks of coefficients for transmission having different starting conditions such as necessary coefficients, percent transmitted, percent to be transmitted, etc. The filled areas in frequency coefficient blocks 101A–103A indicate non-zero coefficients; the shaded areas of the Scaled blocks 101B–103B denote the coefficients necessary for rendering the scaled view in the second display area; whereas the shaded areas in the Mask blocks 101C–103C represent coefficients that are already transmitted or coefficients that are zero. Note that all coefficients are zero by default, therefore all zero coefficients are considered to have been transmitted by default and appear as shaded in the Mask blocks. To prioritize transmission of coefficients in the three frequency coefficient blocks 101A–103A, the statistics of each block are evaluated constantly during the ongoing process of determining which coefficients are to be transmitted, as shown in Table 1:

TABLE 1

|  | Necessary Coefficients (#) | Round | Transmitted Coefficients (#) | Transmitted Coefficients (%) | Un-transmitted Coefficients (#) |
|---|---|---|---|---|---|
| Block 101 | 12 | 0 | 4 | 33.3 | 8 |
|  |  | 1 | 5 | 41.7 | 7 |
|  |  | 2 | 5 | 41.7 | 7 |
|  |  | 3 | 6 | 50 | 6 |
| Block 102 | 12 | 0 | 5 | 41.7 | 7 |
|  |  | 1 | 5 | 41.7 | 7 |
|  |  | 2 | 5 | 41.7 | 7 |
|  |  | 3 | 5 | 41.7 | 7 |
| Block 103 | 9 | 0 | 3 | 33.3 | 6 |
|  |  | 1 | 3 | 33.3 | 6 |
|  |  | 2 | 4 | 44.4 | 5 |
|  |  | 3 | 4 | 44.4 | 5 |

(where a "round" of transmission corresponds to an ongoing evaluation process of the statistics for determining which coefficients are to being transmitted). FIG. 10B shows the state of the Mask Image data 101C–103C after three rounds of prioritized transmission (rounds 0–2) of coefficients of corresponding frequency coefficient blocks 101A–103A. Initially at round 0, block 101 and block 103 both have the lowest percentage of previously transmitted coefficients (33.3%), but block 101 has more un-transmitted coefficients (i.e., 8 un-transmitted coefficients), so block 101 is given the highest priority and coefficient 104 is transmitted. At round 1, after a coefficient from block 101 is selected for transmission, block 103 now has the lowest percentage of transmitted coefficients (33.3%), thus the highest priority and coefficient 105 is transmitted. Now that a coefficient from block 103 is selected to the bit stream for transmission, at round 2, block 101 and block 102 have the lowest percentage of transmitted coefficients (41.7%). To break the tie, the number of un-transmitted coefficients is evaluated. Coincidentally, both block 101 and block 102 have the same number of un-transmitted coefficients (i.e., 7 un-transmitted). At this stage, raster order takes precedence. Since block 101 is on above block 102, block 101 gets higher priority and coefficient 106 is transmitted. At round 3, block 102 has the highest priority due to the lowest percentage of transmitted coefficients (41.7%). This process goes on until all necessary coefficients are transmitted. If more bandwidth is available, predictive caching is carried out. This transport scheme allows graceful degradation in that if the transmission channel is temporarily disabled or bandwidth availability is significantly reduced when displaying a new region of interest, the rendering engine for displaying the scaled image on the second display can still generate a low resolution version of the image using the currently available (i.e., previously transmitted) frequency coefficients. Then, as the communication channel is restored and/or bandwidth increases and more coefficients are transmitted, the image is rendered at a higher resolution.

Figure 11:
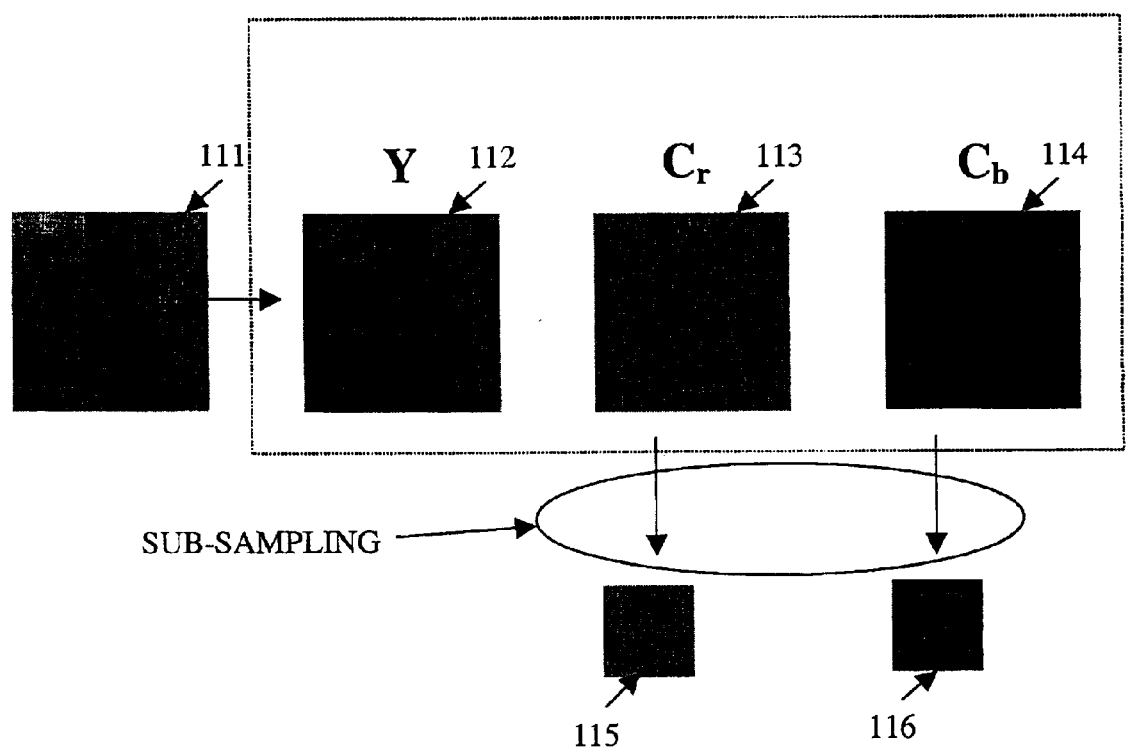
FIG. 11 illustrates an embodiment of the method for color space sub-sampling to improve bandwidth efficiency.

In still another embodiment of the present invention, bandwidth efficiency can be further improved by exploiting the type of color space used to represent the image. As is well known in the field of image processing, an image block 11 (FIG. 11) can be represented in a $YC_rC_b$ color space, which comprises a luminance channel (block 112) and two chrominance components (blocks 113 and 114). Note that high frequency information is only retained in the luminance channel 112, but not in the chrominance channels 113 or 114. This characteristic allows a more compact representation of the image prior to transmission where the chrominance channels (i.e., blocks 113 and 114) are sub-sampled by a factor of 2 to obtain blocks 115 and 116 (FIG. 11). Using luminance information 112 and sub-sampled chrominance information 115 and 116, achieves a compression ratio of 2 compared to using full color channels.

In still another embodiment of the present invention, frequency coefficients are prioritized for transmission by setting the luminance information at a higher priority for transmission than chrominance information. In this case, coefficients from the luminance channel are transmitted first to yield a monochrome display, and then coefficients from chrominance channels are transmitted to render a color display.

In still another embodiment, the coefficient data 90A is encoded by assuming that the system 70 and the apparatus 75 are synchronized under a guaranteed delivery protocol such that at any point of time both the system and the apparatus know which coefficients in each region of the image have been transmitted, and which additional coefficients are required. For example, if initially, coefficients for a given region in a 3×4 low-order window are transmitted to the apparatus and then the apparatus indicates (via a new ROI) that a larger window having coefficients in a 5×7 low order window is required, the system will transmit an encoded bitstream corresponding to the additional coefficients required to enable the apparatus to obtain all coefficients in 5×7 low-order window. In this embodiment, both the system and the apparatus maintain a binary mask of coefficients already known for each image region. The apparatus requests low-order M×N coefficients of which K are already known, leaving MN−K unknown coefficients that must be conveyed. At the system, the quantized frequency coefficients are scanned in a zigzag order similar to that in JPEG, but excluding the ones already known or outside the requested M×N window. In this ordered set (with MN−K coefficients), the position of the last non-zero coefficient, say L, is first conveyed using $\lceil \log_2(MN-K) \rceil$ bits. L is in effect the total number of coefficients to scan out of a maximum of MN−K. The remaining MN−K−L coefficients are dropped from the scan and reconstructed as 0.

Next, the sequence of L unknown coefficients in the zigzag scan order is conveyed using combined arithmetic and binary encoding. Each coefficient is assigned a category, based on its true value. Category 0 stand for value {0}; category 1 stands for value {−1, 1}; category 2 stands for values {−3, −4, 3, 4}; category 3 stand for values {−5, −6, −7, −8, 5, 6, 7, 8}; and so on. In general, for category c, an additional c bits specify the exact value of the coefficient. In the preferred encoding scheme, the category is arithmetic encoded, while the additional bits for each coefficient are left uncoded.

The category encoding follows several probability models, depending on the position of the coefficient being encoded, and its context. First, each frequency coefficient in zigzag scan order is classified based on its position into 7 different classes as depicted in Table 2 below.

TABLE 2

| 0 | 1 | 2 | 3 | 3 | 4 | 4 | 5 |
|---|---|---|---|---|---|---|---|
| 1 | 2 | 3 | 3 | 4 | 4 | 5 | 5 |
| 2 | 3 | 3 | 4 | 4 | 5 | 5 | 6 |
| 3 | 3 | 4 | 4 | 5 | 5 | 6 | 6 |
| 3 | 4 | 4 | 5 | 5 | 6 | 6 | 6 |
| 4 | 4 | 5 | 5 | 6 | 6 | 6 | 6 |
| 4 | 5 | 5 | 6 | 6 | 6 | 6 | 6 |
| 5 | 5 | 6 | 6 | 6 | 6 | 6 | 6 |

Then, based on its context (depending on neighboring coefficients already encoded), the class is moved up or down. For example, consider a coefficient at the fourth column of the third row. Then based on position alone, the class of the coefficient is 4 (see Table 2). However, if from its context it is found that the current coefficient is likely to have a larger (smaller) value, the class is modified to a lower (higher) class, such as 3 (5), if there is room. In particular, for each coefficient, the context is given by the categories of one or more neighboring coefficients that come before the current coefficient in scan order.

The modified class of the coefficient yields one of 7 probability models to be used for arithmetic encoding of the coefficient's category. The models are chosen such that in higher classes, the lower categories are more probable than higher ones, but less so if the context is high. Note that 'category' depends on the true value of the coefficient, whereas 'class' determines its expected magnitude based on its position and context.

In the preceding description, numerous specific details are set forth, such as encoding techniques and the number of regions of the image in order to provide a thorough understanding of the present invention. It will be apparent, however, to one skilled in the art that these specific details need not be employed to practice the present invention. In instances, well-known transmission steps and image processing techniques have not been described in detail in order to avoid unnecessarily obscuring the present invention.

In addition, although elements of the present invention have been described in conjunction with certain embodiments, it is appreciated that the invention can be implement in a variety of other ways. Consequently, it is to be understood that the particular embodiments shown and described by way of illustration are in no way intended to be considered limiting. Reference to the details of these embodiments is not intended to limit the scope of the claims which themselves recited only those features regarded as essential to the invention.

We claim:

1. A method of transmission of an image adapted to a first display area to an apparatus having a smaller second display area, said method comprising:

dividing the image into a plurality of regions each having a corresponding block of data;

converting each block into a frequency domain representation comprising an array of coefficients;

cropping frequency coefficients of a portion of the arrays so as to cause corresponding regions of the image to be scaled when converted into a spatial domain representation dependent on the amount of cropping wherein cropped blocks of coefficients are obtained;

transmitting coefficient data including the cropped blocks and un-cropped arrays of frequency coefficients to the apparatus for displaying a scaled version of the image in the second display area.

2. The method as described in claim 1 further comprising:

identifying a region of interest within the scaled version of the image wherein at least one of the plurality of blocks of data corresponds to the identified region of interest;

wherein the frequency coefficient array of at least one block of data corresponding to the region of interest is cropped less than the coefficient arrays corresponding to the remaining regions of the scaled version of the image.

3. The method as described in claim 1 further comprising compressing the coefficient data prior to transmitting and decompressing prior to displaying in the second display area.

4. The method as described in claim 2 further comprising:

storing the coefficient data prior to transmitting to the apparatus;

identifying a new region of interest within the image;

determining new coefficient data dependent on the new region of interest;

determining a sub-set of coefficient data representing the difference between the previously transmitted coefficient data and the new coefficient data; and transmitting this sub-set of coefficient data to the apparatus for combining with coefficient data previously transmitted to the apparatus so as to provide image data for redisplaying the scaled version of the image in the second display area dependent on the new region of interest.

5. The method as described in claim 4 wherein identifying a new region of interest comprises selecting the new region through a user interface.

6. The method as described in claim 1 wherein each block has an associated scale factor dependent on the size of the first display area, the size of the second display area and the size of the block wherein each block is cropped according to its associated scale factor.

7. The method as described in claim 6 further comprising selecting a scale factor for each of the blocks by adjusting the size of each of the plurality of regions.

8. The method as described in claim 1 wherein the apparatus is a handheld device.

9. The method as described in claim 1 further comprising transmitting coefficient data in a perceptually significant sequence by transmitting low frequency coefficients corresponding to the entire image then transmitting higher frequency coefficients corresponding to the ROI and then transmitting the remainder of the coefficient data that is required.

10. A system for transmitting an image adapted to a first display area, said system comprising:

image divider for dividing the image into a plurality of regions each having a corresponding block of data;

image data converter for converting each block into a frequency domain representation comprising an array of coefficients;

frequency coefficient cropper for cropping frequency coefficients of a portion of the arrays so as to cause corresponding regions of the image to be scaled when converted into a spatial domain representation dependent on the amount of cropping wherein cropped blocks of coefficients are obtained;

data transmitter for transmitting coefficient data including the cropped blocks and un-cropped arrays of coefficients to the apparatus for displaying a scaled version of the image in a second smaller display area.

11. The system as described in claim 10 wherein the apparatus comprises a user interface for selecting a region of interest (ROI) within the second display area and for transmitting a ROI pointer to the coefficient cropper wherein the selected ROI has at least one corresponding array of coefficients and wherein in response to the ROI pointer, the coefficient cropper crops at least one ROI coefficient array less than the arrays corresponding to the remaining of the plurality of regions.

12. The system as described in claim 10 further comprising an encoder for encoding the coefficient data prior to transmitting to the apparatus and the apparatus comprising a decoder for decoding encoded coefficient data.

13. The system as described in claim 10 wherein the apparatus further comprises means for driving the second display area dependent on the transmitted coefficient data to display the scaled version of the image.

14. A system as described in claim 10 wherein the display driver comprises a means for converting the coefficient data into a spatial domain representation.

15. The system as described in claim 13 wherein the apparatus comprises a first means for storing transmitted coefficient data including previously received coefficient data and newly received coefficient data and the display driver further comprises a means for rendering the scaled version of the image within the second display screen, wherein the rendering means selects coefficients from the first storage means for displaying the scaled version of the image in response to the region of interest pointer.

16. The system as described in claim 14 wherein the system further includes a second means for storing all coefficient data previously transmitted to the apparatus and comprising means for determining a subset of coefficients corresponding to the difference between previously transmitted coefficient data and new coefficient data corresponding to a new ROI pointer received from the apparatus.

17. The system as described in claim 16 wherein the first and second storage means are synchronized under a guaranteed delivery protocol.

\* \* \* \* \*